United States Patent

Hinchliffe

Patent Number: 5,252,300
Date of Patent: Oct. 12, 1993

[54] CORROSION INHIBITION PROCESS

[75] Inventor: Clement Hinchliffe, Pymble, Australia

[73] Assignee: Aquazon Pty. Ltd., Pymble, Australia

[21] Appl. No.: 878,848

[22] Filed: May 5, 1992

[51] Int. Cl.$^5$ .................. C23F 11/08; C23F 15/00
[52] U.S. Cl. .................. 422/186.08; 422/7; 422/186.07; 210/760
[58] Field of Search .......... 422/186.07, 186.12, 422/9, 7, 186.08; 210/760

[56] References Cited

U.S. PATENT DOCUMENTS

| | | | |
|---|---|---|---|
| 4,172,786 | 10/1979 | Humphrey et al. | 210/57 |
| 4,724,085 | 2/1988 | Pohoreski | 210/713 |
| 5,106,497 | 4/1992 | Finnegan | 210/192 |
| 5,114,576 | 5/1992 | Ditzler et al. | 210/195.1 |

OTHER PUBLICATIONS

Metcalf et al., "Wastewater Engineering: Treatment Disposal Reuse", 2nd Ed., McGraw-Hill, 1979, pp. 99, 258-262.

Primary Examiner—Daniel D. Wasil
Assistant Examiner—Daniel Jenkins
Attorney, Agent, or Firm—Christie, Parker & Hale

[57] ABSTRACT

The invention provides a method and apparatus for reducing corrosion in a water recirculation system. The method involves ozonating the water and adjusting the level of the calcium bicarbonate in the ozonated water to a predetermined level. The predetermined level is a level above that which would cause a scaling water but will not cause such scaling in the ozone solution.

6 Claims, 1 Drawing Sheet

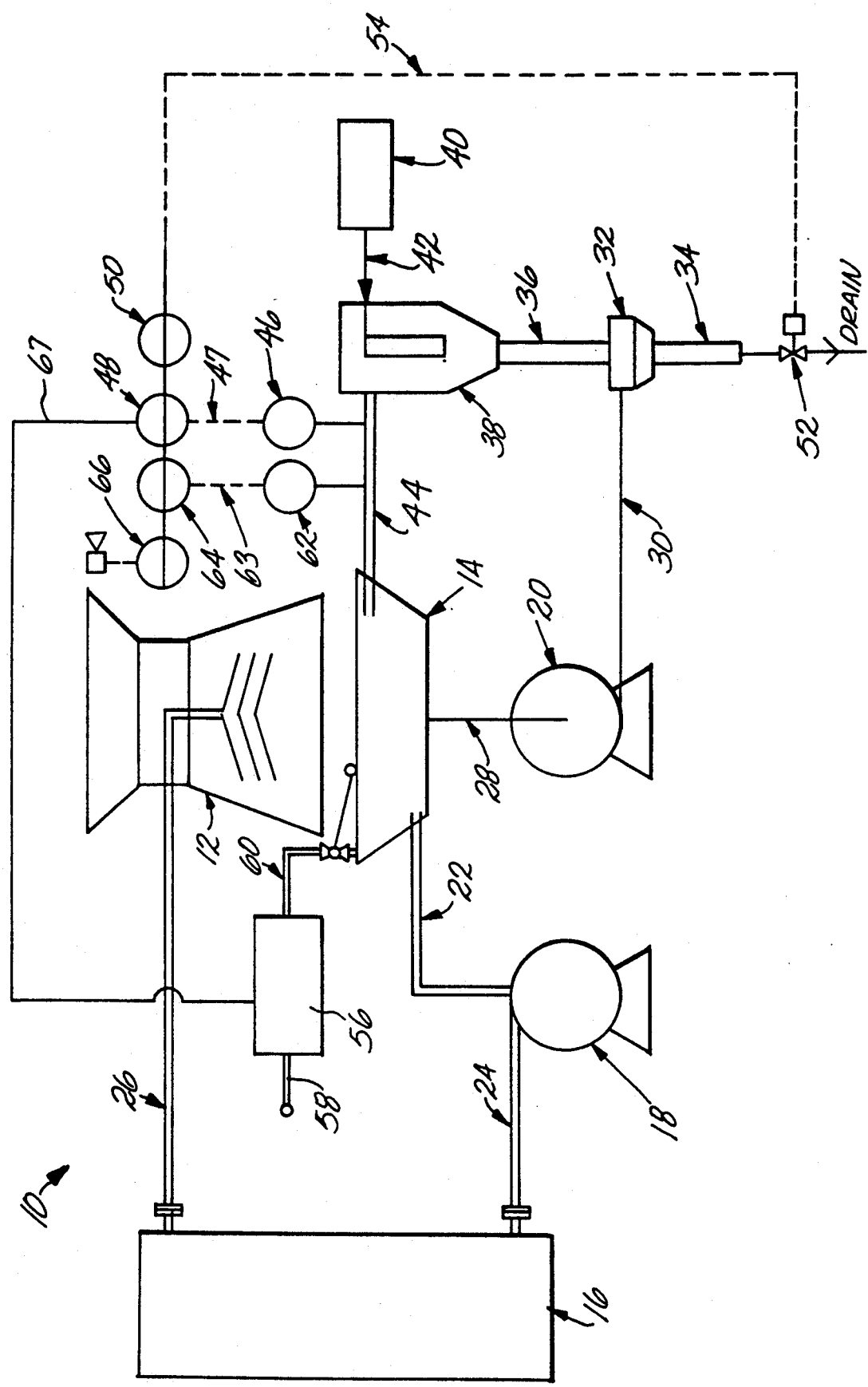

CORROSION INHIBITION PROCESS

BACKGROUND OF THE INVENTION

The present invention relates to a method and apparatus for reducing corrosion in a tank containing water. The present invention is particularly applicable to water cooling towers.

There are many manufacturing plants, power generating systems and air conditioning installations which require efficient cooling. This cooling is generally achieved by using recirculating water systems to obtain the most efficient utilisation of water.

The typical system consists of a basin or sump from which a pump circulates water through pipes to other components, which are normally one or more heat exchangers and a cooling tower, in which the warmed water is sprayed into an air stream. Cooling is achieved by the evaporation of the circulating water. The cooled water falls into the basin to complete the circuit. Any make up water needed, to replace water evaporated or bled from the system, is added into the basin. As water evaporates from the system the concentration of natural salts is increased.

Scale formation and/or silt accumulation reduces the efficiency and performance of the cooling system due to restricted heat transfer and interference with water flow.

The evaporation of water from the cooling tower increases the concentration of natural salts in the circulating water. As this process continues, the natural calcium alkaline hardness in the water will pass its solubility limit and scale formation will take place. The higher temperatures at the heat transfer surfaces increases the rate of scale formation on these surfaces, thereby reducing the efficiency and operating capacity of the unit.

Often scale formation is accompanied by the trapping of airborne debris, removed from the cooling air by the scrubbing action of the water which is sprayed through the tower. This inclusion of corrosion product debris or a combination of these materials is often held more tightly together by organic growths.

The accumulation of debris in the absence of scaling results in silt creation.

Generally it is necessary to bleed off some of the concentrated water to limit scale formation and silting problems. In many cases the volumes of water which have to be bled off to prevent scaling are excessive and very precise control is required to achieve satisfactory results. This generally results in the method being impractical.

An extension of this method is the addition of acids to the circulating water. Very precise addition, mixing and control is needed to prevent severe damage to the system when acids are added. There are also problems of safety arising from the need to store, handle and apply these acids.

Target concentration for the addition of acid or bleed off of water may be calculated using the Langelier Index, however, this technique is far from satisfactory as the allowable margins of error are extremely limited. These margins are greatly exceeded if there are any variations in the water composition. These methods also impose severe control requirements, especially in high output, smaller water capacity systems which have come into use in recent times, and which make such control extremely difficult.

Most waters are corrosive and this problem may be aggravated by absorption of acidic gases and other impurities from the cooling air. In addition, many of the salts in solution in the water enhance corrosion, particularly chlorides. Corrosive attack on the metal surfaces reduces the life of the plant necessitating repairs or complete replacement of the plant.

Corrosion product build up also interferes with heat transfer and water distribution, and this may be amplified by the inclusion of scale, silt, airborn material or organic matter.

The control of corrosion by achieving desirable calcium bicarbonate concentrations in circulating water using the Langelier Index is an excellent method in theory, however, in practice it has been found to be very difficult to apply given, the very precise control requirements needed to give the desired protection without scale formation. Attempts to widen the control parameters using scale modifiers have only been partially successful.

The use of various corrosion inhibitors such as chromates, zinc etc. has met with some success, however, increasingly tighter controls on the discharge of toxic wastes has led to severe limitations on the use of these chemicals. In addition, the emission of water droplets or aerosols from the air exhausts of water cooling towers containing toxic chemicals have caused concern to health authorities, and pollution control regulations are now increasingly preventing the use of these inhibitors.

The presence of organic contamination of the water in the recirculating water system provides the basis for very rapid growth of various forms of biological contaminants, such as slime, algae and bacteria. The conditions of temperature and aeration present in these systems also helps to promote the growth of biological contaminants, as does exposure to sunlight.

Algae and slimes themselves reduce heat transfer. They also increase the mass of scale and silt and bind it more firmly to internal surfaces of the cooling system further aggravating heat transfer problems. Corrosion is frequently accelerated by the presence of organic matter, which can also interfere with water distribution through the cooling tower, reducing the cooling effect. Bacterial contamination of the water circulating systems is also of great concern. Many bacteria are highly dangerous and in recent years special attention has been drawn to the pathogenicity of some strains of Legionnella, particularly for the elderly and others whose resistance to disease is diminished. It is now generally felt that many deaths caused by Legionnella had been previously attributed to other causes.

Bacteria pass into the exhaust air from a tower as aerosols. These can be sucked in by fresh air intakes of air conditioning systems or can drift into the street and can then be inhaled by people possibly causing infection. Bacteria may also escape from the system in the bleed off water and in aerosols created when the system is washed out or maintenance is taking place.

A wide range of chemicals such as chlorine, have been used to control biological growth with reasonable success in relation to algae and slime but with varying effect in relation to bacterial contamination.

Due to greater public awareness of the dangers of microbial contamination of cooling systems water in air conditioning systems, attention has been focussed on other methods of disinfecting the water present in these systems. One method of disinfection involves of the use of ozone.

Apart from being a very effective biocide ozone provides a number of other benefits. Ozone has been found to passivate metal surfaces with an oxidised film or layer, and has been shown to have scale inhibiting properties. Algae, slime and other impurities in the water additionally act as a glue for solids such as calcium and other particulate matter to form layers of scale. By oxidising all slime and algae, ozone prevents such solids from being glued into scale layers on the walls of cooling towers and condensed water piping. The same properties also de-scale old cooling water systems.

Another benefit achieved in the use of ozone is that ozone has a microfloculating effect on the cooling water which causes particulate matter to coagulate and settle to the bottom of the cooling tower or strainer as a fluidized powder or slurry.

It is known that the presence of calcium bicarbonate will inhibit corrosion of metal surfaces. However, the use of an excess of calcium bicarbonate typically leads to the formation of scale.

SUMMARY OF THE INVENTION

The present inventor has surprisingly found that a combination of the use of ozone and adjustment of the concentration of calcium bicarbonate in the water leads to an enhancement of the corrosion inhibitory effect in comparison to either alone.

Accordingly, in a first aspect the present invention consists in a method for reducing corrosion in a water recirculation system, the method comprising ozonating the water and monitoring and adjusting the concentration of calcium bicarbonate in the ozonated water to a predetermined level, the predetermined level being a level above that which would cause scaling in water but which will not cause such scaling in the ozone solution.

In general terms the concentration of calcium bicarbonate is adjusted to give a positive Langelier index. Typically water with a negative Langelier index is corrosive whilst water with a positive Langelier index is scale-forming. The present inventors have made the surprising finding that in combination with ozonation calcium salts plus bicarbonate salts can be added to the water to form calcium bicarbonate to give levels resulting in a positive Langelier index without forming scale. This ability to operate with a positive Langelier index results in a reduction in corrosion.

In a preferred embodiment of the present invention the calcium bicarbonate concentration is adjusted to the predetermined level by dosing the ozonated water with soluble salts which will form calcium bicarbonate in the water.

The concentration of calcium bicarbonate can be monitored by any known means, however, at present it is preferred that the level of calcium bicarbonate is monitored by measurement of the conductivity of the ozonated water. The conductivity of the water is proportional to the level of total dissolved solids. By knowledge of the proportion of the total dissolved solids due to calcium bicarbonate, the conductivity measurement provides a simple and efficient measurement of the concentration of calcium bicarbonate.

In a second aspect the present invention consists in an apparatus for reducing corrosion in a water recirculation system, the apparatus comprising an ozone generator connected to the system in a manner such that ozone produced by the ozone generator is released into the water, sensor means which measures the calcium bicarbonate concentration in the water or another characteristic of the water, said other characteristic being proportional to the calcium bicarbonate concentration, and control means connected to the system for maintaining the calcium bicarbonate concentration of the water at a predetermined level, the predetermined level being a level above that which would cause scaling in water under the operating conditions of the system but which will not cause such scaling in the ozone solution under the same conditions, said control means being responsive to output from said sensor means.

It is preferred that the sensor means monitors the total dissolved solids concentration in the water. This concentration will be a function of the concentration of calcium bicarbonate in the water. The total dissolved solids concentration is preferably monitored using a conductivity monitor.

The control means preferably consists of a valve means which enables the removal of concentrated water from the system and its replacement with fresh water. For example, when the calcium bicarbonate concentration exceeds the desired level as determined by the sensor means, the control means enables the removal of a proportion of the water from the system and replacement of this water with water having a lower concentration of calcium bicarbonate.

In a preferred embodiment of the present invention the control means includes dosing means for the addition of soluble salts which will form calcium bicarbonate in the water.

In a further preferred embodiment of the present invention the system is also provided with a second sensor means which measures the residual oxidation capacity of the water. The residual oxidation capacity of the water is a function of the ozone treatment. It is preferred that this sensor is connected to an alarm system which is activated when the residual oxidation capacity of the water drops below a predetermined level. The residual oxidation capacity of the water can be sensed by an appropriate electrode and measured by a Redox monitor in millivolts. It is preferred that the Redox potential is maintained in the range of 700 to 900 millivolts.

The present invention by utilising the combined effects of ozonisation and increased calcium bicarbonate concentration results in a surprisingly effective reduction in the level of corrosion with no scale formation.

In order that the nature of the present invention may be more clearly understood, a preferred form thereof will now be described with reference to the following example and accompanying drawing.

BRIEF DESCRIPTION OF THE DRAWING

The FIGURE is a block schematic view of a cooling water treatment system according to this invention.

DESCRIPTION OF THE PREFERRED EMBODIMENTS

The water recirculation system 10 includes a cooling tower 12, sump 14, heat exchangers 16 and first and second pump means 18 and 20 respectively. Water is drawn from sump 14 through line 22 by first pump means 18 from where it is transferred to heat exchanger 16 via line 24.

The water passes through heat exchanger 16 and flows via line 26 to cooling tower 12. The water passes through the cooling tower 12 into sump 14.

Water is also withdrawn from sump 14 by second pump means 20 via line 28. Water then passes from the second pump means 20 to a filter 32 via line 30. Typically filter 32 would only be required in situations where the water contains heavy insoluble pollutants. Water may then flow from the filter to the drain via line 34 or to an ozone contact region 38 via line 36. Water reaching the ozone contact region 38 is contacted with ozone produced by ozone generator 40 which passes to the ozone contact region 38 via line 42. Water contacted with ozone in the ozone contact region 38 then flows to the sump 14 via line 44.

The level of total dissolved solids in the water in line 44 is sensed by means of conductivity element 46 which is connected to line 44. Information from the conductivity element 46 is passed to the conductivity controller 48 by line 47. If the level of total dissolved solids is too high as determined by the conductivity controller 48 a signal is passed via conductivity alarm 50 to valve 52 via line 54. This signal causes valve 52 to open allowing water to pass from the system via line 34 to the drain.

When water is allowed to pass from the system via line 34 and valve 52, make up water is provided via line 58. Provided on line 58 is calcium bicarbonate dosing means 56. The make up water dosed with calcium bicarbonate passes from the calcium bicarbonate dosing means 56 into sump 14 via line 60.

When the level of total dissolved solids is sensed to be too low by conductivity controller 48, a signal is sent from the conductivity controller 48 to the calcium bicarbonate dosing means 56 via line 57. This results in calcium bicarbonate being dosed into the system. The amount of make up water added to the system is also regulated by the conductivity control means 48 by controlling the amount of water passing through the calcium bicarbonate dosing means 56 by signals passed through line 57.

The level of ozone in the water in line 44 is sensed by Redox sensing means 62 which is connected to line 44. Signals from Redox sensing means 62 is passed to control means 64 by line 63. If the level of ozone is sensed as being too low by control means 64 alarm means 66 is activated.

EXAMPLE

In order to demonstrate the applicability of the present invention tests were carried out in the Wollongong area, which has a water supply which is very low in dissolved solids, calcium hardness and total alkalinity.

When this water is used in cooling water systems, it is impossible to achieve sufficient concentration of the mineral content in the water to reach positive Langelier index values, therefore the water is always corrosive unless corrosion inhibitors are used.

To demonstrate the application of our claim, we evaluated the corrosion rates on two systems, each subject to ozone treatment.

System A. The cooling water system at a large department store, operating shopping centre hours, approximately 60 hours per week, 52 weeks per year.

System B. The cooling system at an industrial plant operating 24 hrs/day, 365 days per year.

In one series of month long tests, the water in System A was modified by the addition of calcium salts and bicarbonate, to give Langelier index values which averaged +0.6. The water in System B was not modified and had average Langelier index values of −1.1.

|  | Corrosion Rates | | Scale formation |
|---|---|---|---|
|  | Copper | Mild Steel |  |
| System A | 0.03 m.p.y. | 2.10 m.p.y. | Nil |
| System B | 0.44 m.p.y. | 16.06 m.p.y. | Nil |

To check the reproducability of these results, a second series of test were carried out and the results were as follows.

|  | Av. Langelier Index | Corrosion rates | | Scale Formation |
|---|---|---|---|---|
|  |  | Copper | Mild Steel |  |
| System A | −0.5 | 0.50 | 12.80 | Nil |
| System B | +1.2 | 0.02 | 1.94 | Nil |

By reversing the test, it is clear that the decrease in corrosion rate observed is not due to differences in the system but due to the method of the present invention. The test coupons from the Ozone treated systems which had positive index values were black and had a similar appearance to phosphate treated steel.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method for reducing corrosion in a water recirculation system, the method comprising the steps of: ozonating recirculated water, monitoring the concentration of calcium bicarbonate in the recirculated water after the recirculated water has been ozonated, adjusting the concentration of calcium bicarbonate in the recirculated water in response to the monitoring so as to maintain the concentration of calcium bicarbonate in the ozonated water greater than a calcium bicarbonate concentration that would result in scaling in the recirculated water but for the presence of the ozone in the recirculated water.

2. A method as claimed in claim 1 in which the calcium bicarbonate concentration is adjusted by dosing the ozonated water with soluble salts which will form calcium bicarbonate in the water.

3. A method as claimed in claim 1 or claim 2 in which the concentration of calcium bicarbonate is monitored by measurement of the conductivity of the ozonated water.

4. An apparatus for reducing corrosion in a water recirculation system, the apparatus comprising an ozone generator connected to the system in a manner such that ozone produced by the ozone generator is released into the water, sensor means for measuring the calcium bicarbonate concentration in the water or for measuring another characteristic of the water, being proportional to the calcium bicarbonate concentration, and a control means connected to the system for maintaining the calcium bicarbonate concentration of the water at being a level above that which would cause scaling in the water under operating conditions of the system but for the presence of the ozone in the water, said control means being responsive to output from said sensor means.

5. An apparatus as claimed in claim 4 in which the sensor means monitors the total dissolved solids concentration in the water.

6. An apparatus as claimed in claim 4 or 5 in which the control means includes dosing means for the addition of soluble salts which will form calcium bicarbonate in the water.

* * * * *